United States Patent
Choi et al.

(10) Patent No.: US 12,008,683 B2
(45) Date of Patent: Jun. 11, 2024

(54) VEHICLE AUGMENTED REALITY NAVIGATIONAL IMAGE OUTPUT DEVICE AND CONTROL METHODS

(71) Applicant: LG ELECTRONICS INC., Seoul (KR)

(72) Inventors: Sunghwan Choi, Seoul (KR); Dukyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 17/771,657

(22) PCT Filed: Jan. 6, 2020

(86) PCT No.: PCT/KR2020/000196
§ 371 (c)(1),
(2) Date: Apr. 25, 2022

(87) PCT Pub. No.: WO2021/141145
PCT Pub. Date: Jul. 15, 2021

(65) Prior Publication Data
US 2022/0383556 A1   Dec. 1, 2022

(51) Int. Cl.
*G06T 11/00* (2006.01)
*B60K 35/00* (2006.01)
(Continued)

(52) U.S. Cl.
CPC .......... *G06T 11/00* (2013.01); *G01C 21/3647* (2013.01); *G01C 21/365* (2013.01); *G06V 10/761* (2022.01); *G06V 10/945* (2022.01); *G06V 20/582* (2022.01); *B60K 35/00* (2013.01); *B60K 35/28* (2024.01);
(Continued)

(58) Field of Classification Search
None
See application file for complete search history.

(56) References Cited

U.S. PATENT DOCUMENTS

| | | | |
|---|---|---|---|
| 2012/0173067 A1* | 7/2012 | Szczerba | G06F 3/041 701/1 |
| 2014/0218509 A1* | 8/2014 | Kondo | G01C 21/3658 348/118 |

(Continued)

FOREIGN PATENT DOCUMENTS

| | | |
|---|---|---|
| KR | 20150087619 | 7/2015 |
| KR | 20180004576 | 1/2018 |

(Continued)

*Primary Examiner* — Edward Martello
(74) *Attorney, Agent, or Firm* — Fish & Richardson P.C.

(57) ABSTRACT

The present disclosure relates to an image output device disposed at a vehicle to enable augmented reality and a method for controlling the same. The image output device includes an image output unit configured to output visual information for realizing the augmented reality, a communication unit configured to receive a forward image that captures an image in a forward direction of the vehicle, and a processor configured to search for at least one planned driving lane on which the vehicle is planned to travel from the forward image and control the image output unit such that a main carpet image indicating the planned driving lane is output in lane units.

19 Claims, 21 Drawing Sheets

(a)

(b)

(51) Int. Cl.
  B60K 35/28     (2024.01)
  G01C 21/36     (2006.01)
  G06V 10/74     (2022.01)
  G06V 10/94     (2022.01)
  G06V 20/58     (2022.01)

(52) U.S. Cl.
  CPC .. *B60K 2360/166* (2024.01); *B60K 2360/177* (2024.01); *B60K 2360/31* (2024.01); *G06T 2200/24* (2013.01); *G06T 2210/32* (2013.01)

(56) References Cited

U.S. PATENT DOCUMENTS

| | | | | |
|---|---|---|---|---|
| 2017/0103571 | A1* | 4/2017 | Beaurepaire | G06F 3/011 |
| 2020/0173804 | A1* | 6/2020 | Zeng | G09B 29/00 |
| 2021/0372803 | A1* | 12/2021 | van der Vlist | G01C 21/3635 |

FOREIGN PATENT DOCUMENTS

| | | |
|---|---|---|
| KR | 101899981 | 9/2018 |
| KR | 101946334 | 5/2019 |

\* cited by examiner 1630a  1630b (a)

(b)

(c)

(a)

(b)

VEHICLE AUGMENTED REALITY NAVIGATIONAL IMAGE OUTPUT DEVICE AND CONTROL METHODS

CROSS-REFERENCE TO RELATED APPLICATIONS

This application is a National Phase Application under 35 U.S.C. § 371 of International Application No. PCT/KR2020/000196, filed on Jan. 6, 2020, which is hereby expressly incorporated by reference into the present application.

TECHNICAL FIELD

The present disclosure relates to an image output device disposed at a vehicle to enable augmented reality, and a method for controlling the same.

BACKGROUND ART

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

An image output device for visually providing an occupant or passenger on board with various information may be disposed at a vehicle. The image output device includes a head-up display (HUD) that presents information through a windshield of a vehicle or a separately provided transparent screen, and/or various displays that output information through a panel.

The image output device is evolving into a way to provide route navigation information to the destination and information regarding a point of interest (POI) while effectively providing various information. In particular, research has been conducted to provide an image output device that can directly and effectively provide necessary information in a manner that does not interfere with driving of the driver who needs to pay attention while driving.

DISCLOSURE OF INVENTION

Technical Problem

The present disclosure is directed to solving the aforementioned problems and other drawbacks.

The present disclosure describes an image output device that can provide various types of information to an occupant or passenger on board using augmented reality, and a method for controlling the same.

The present disclosure also describes an image output device that can allow an occupant to select a driving direction of a vehicle using augmented reality, and a method for controlling the same.

Solution to Problem

The present disclosure relates to an image output device provided or mounted in a vehicle and a method for controlling the same.

The image output device includes: an image output unit configured to output visual information for realizing the augmented reality; a communication unit configured to receive a forward image that captures an image in a forward direction of the vehicle; and a processor configured to search for at least one planned driving lane on which the vehicle is planned to travel from the forward image and control the image output such that a main carpet image indicating the planned driving lane is output in lane units. The processor searches for an object corresponding to a preset condition and controls, upon receiving a preset user input, the image output unit such that a sub carpet image indicating a route to a destination corresponding to the object is output together with the main carpet image.

In some implementations, when a plurality of objects corresponding to the preset condition are present, the processor may control the image output unit such that a plurality of sub carpet images are output together with the main carpet image.

In some implementations, the processor may highlight one of the sub carpet images, and the one sub carpet image highlighted may vary according to a user input.

In some implementations, when the one sub carpet image is selected by a user, the processor may control the communication unit such that a driving direction of the vehicle is changed to a route set in the one sub carpet image.

In some implementations, when the one sub carpet image is selected by the user, the processor may control the image output unit such that the main carpet image disappears.

In some implementations, the processor may set priorities for the plurality of objects and control the image output unit such that the sub carpet images each have a color corresponding to the priorities. When the priorities are changed, the color of at least one sub carpet image may be changed.

In some implementations, when the number of objects corresponding to the preset condition is greater than a criterion number, the processor may filter the number of objects to be the same as the criterion number and control the image output unit such that the criterion number of sub carpet images are output together with the main carpet image.

In some implementations, the processor may filter objects as many as the criterion number based on a gaze of an occupant on board the vehicle.

In some implementations, the processor may search for another vehicle located ahead within a predetermined range with respect to the vehicle as the object and control the image output unit such that at least one of a size, shape, and location of the sub carpet image is changed according to a location of the vehicle.

In some implementations, the processor may calculate fuel efficiency when the vehicle follows the another vehicle and control the image output unit such that the fuel efficiency is output together with the main carpet image and the sub carpet image.

In some implementations, the processor may control the image output unit such that the sub carpet image has a different color according to the fuel efficiency.

In some implementations, when the object is located out of a predetermined range with respect to the vehicle while the sub carpet image is being output, the processor may control the image output unit such that the sub carpet image disappears.

In some implementations, the processor may collect a level of traffic congestion for a route to a destination corresponding to the object and control the image output unit such that the sub carpet image has a different color according to the level of traffic congestion.

In some implementations, in response to the objected searched, the processor may control the image output unit such that an object image indicating the object is output.

In some implementations, the processor may collect object information corresponding to the object and control the image output unit such that the object information is output.

In some implementations, the main carpet image may be a transparent image of a first color and the sub carpet image may be a transparent image of a second color. The processor may search for a portion where the main carpet image and the sub carpet image overlap and control the image output unit such that the portion has a third color mixed with the first color and the second color.

The present disclosure provides a method for controlling the image output device described above, the method includes: receiving a forward image that captures an image in a forward direction of a vehicle; searching for one or more lanes on which the vehicle is planned to travel from the forward image; and outputting a main carpet image indicating the searched one or more lanes in lane units through an image output unit; and outputting, upon receiving a preset user input, a sub carpet image indicating a route to a destination corresponding to the object.

In some implementations, a plurality of sub carpet images may be output together with the main carpet image when a plurality of objects corresponding to the preset condition are present.

In some implementations, the method may further include, when one of the plurality of sub carpet images is selected by a user, changing a driving direction of the vehicle to a route set in the one sub carpet image.

In some implementations, the method may further include controlling the image output unit such that the sub carpet image disappears when the object is located out of a predetermined range with respect to the vehicle while the sub carpet image is being output.

Advantageous Effects of Invention

A path providing device and a method for controlling the same according to the present disclosure may provide the following benefit.

An occupant on board may be provided with information regarding a route for a vehicle to be driven by autonomous driving or by the driver through a main carpet image in lane units.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. The suffixes "module" and "unit" for components or elements used in the following description are given or mixed in consideration of ease in creating specification, and do not have distinct meanings or roles. In describing implementations, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings, and the concept should be construed as being extended to all modifications, equivalents, and substitutes included in the concept and technological scope.

Terms including ordinal numbers such as first and second may be used to describe various elements, but the elements are not limited by the terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

Singular expressions include plural expressions unless the context clearly indicates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, elements, components or combinations thereof are not excluded in advance.

A vehicle disclosed herein may include various types of automobiles such as cars, motorcycles, and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
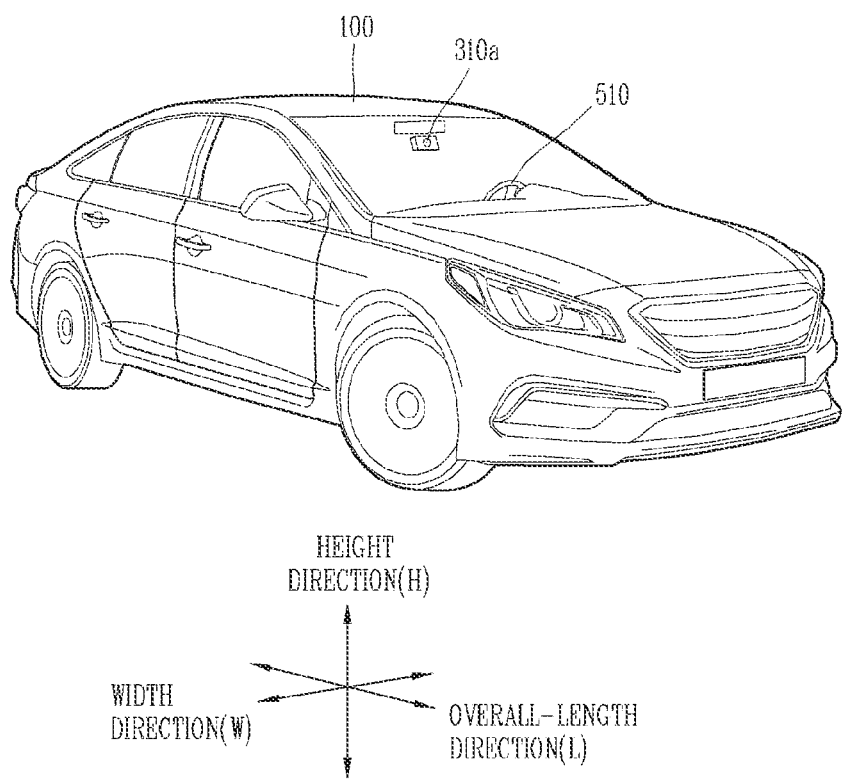
FIG. 1 illustrates an outer appearance of a vehicle according to an implementation of the present disclosure.

FIG. 1 illustrates an outer appearance of a vehicle according to an implementation of the present disclosure.

Figure 2:
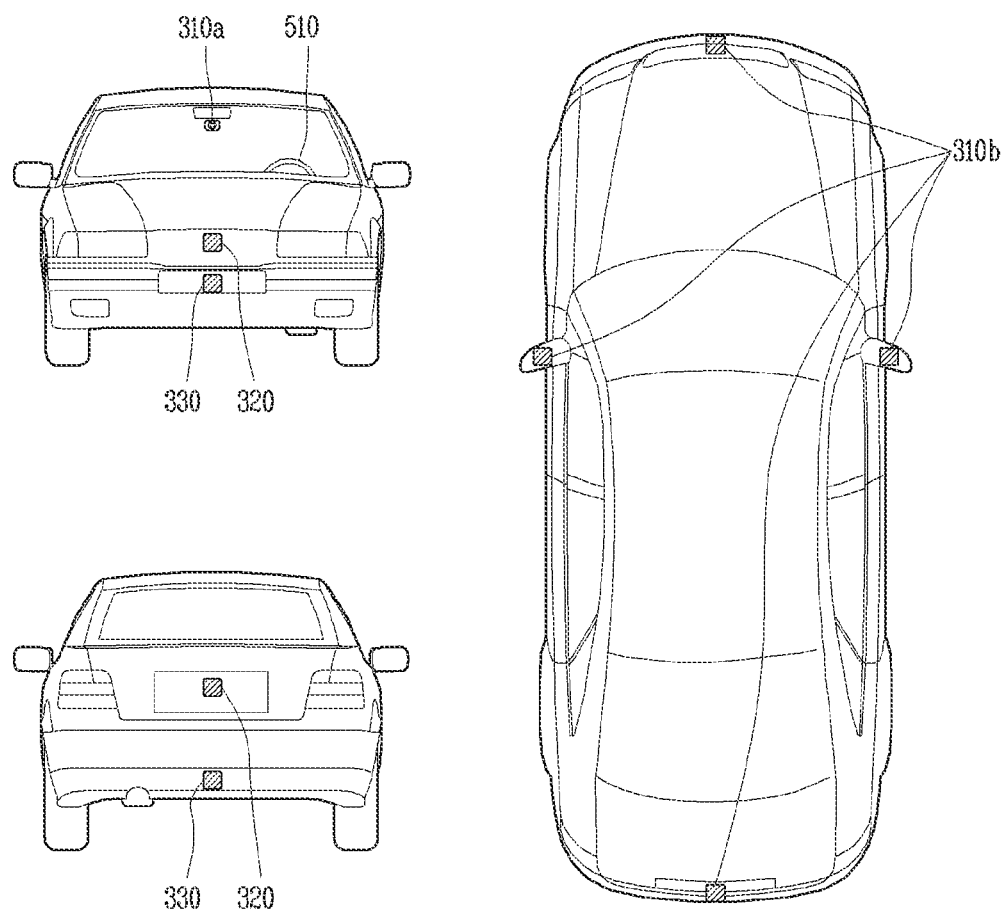
FIG. 2 illustrates a vehicle exterior from various angles.

FIG. 2 illustrates a vehicle exterior from various angles.

Figure 3:
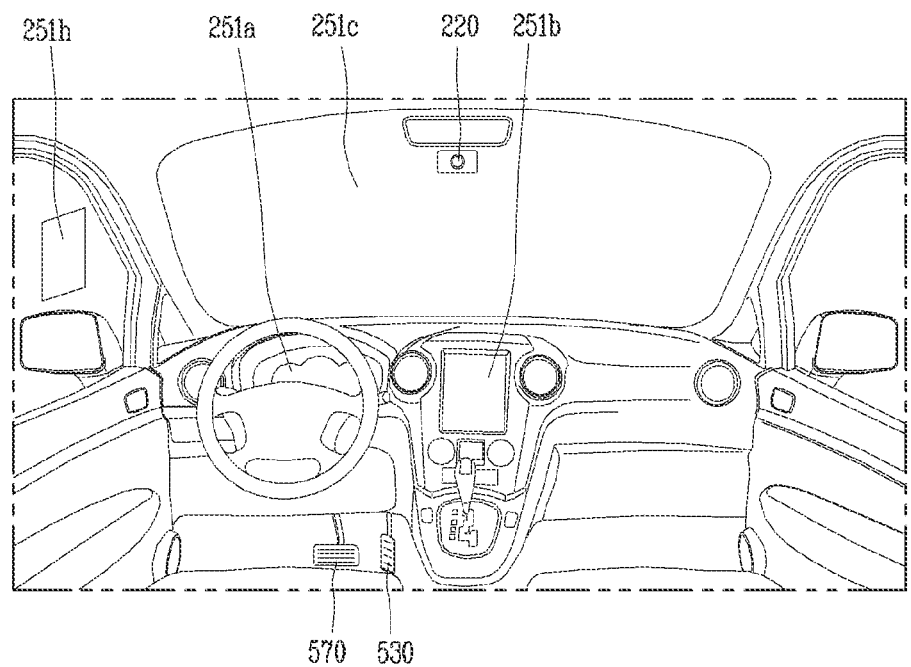
FIGS. 3 and 4 illustrate a vehicle interior.
Figure 4:
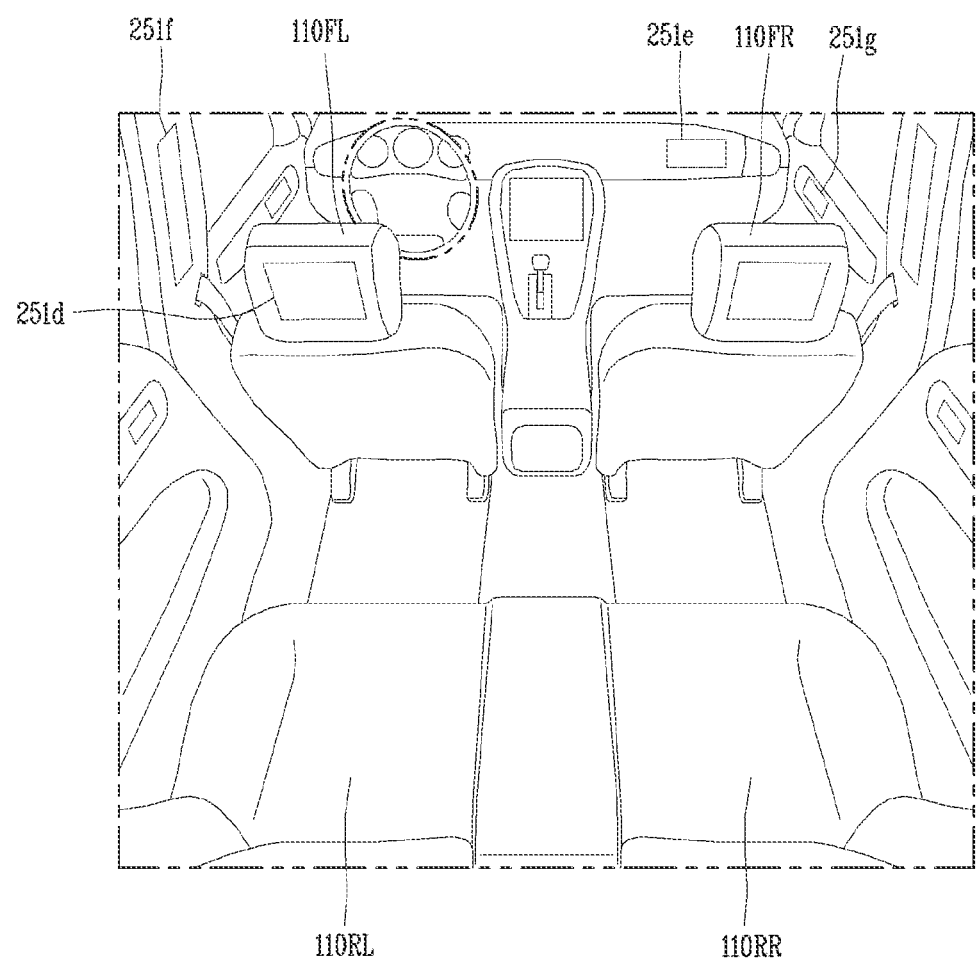

FIGS. 3 and 4 illustrate a vehicle interior.

Figure 5:
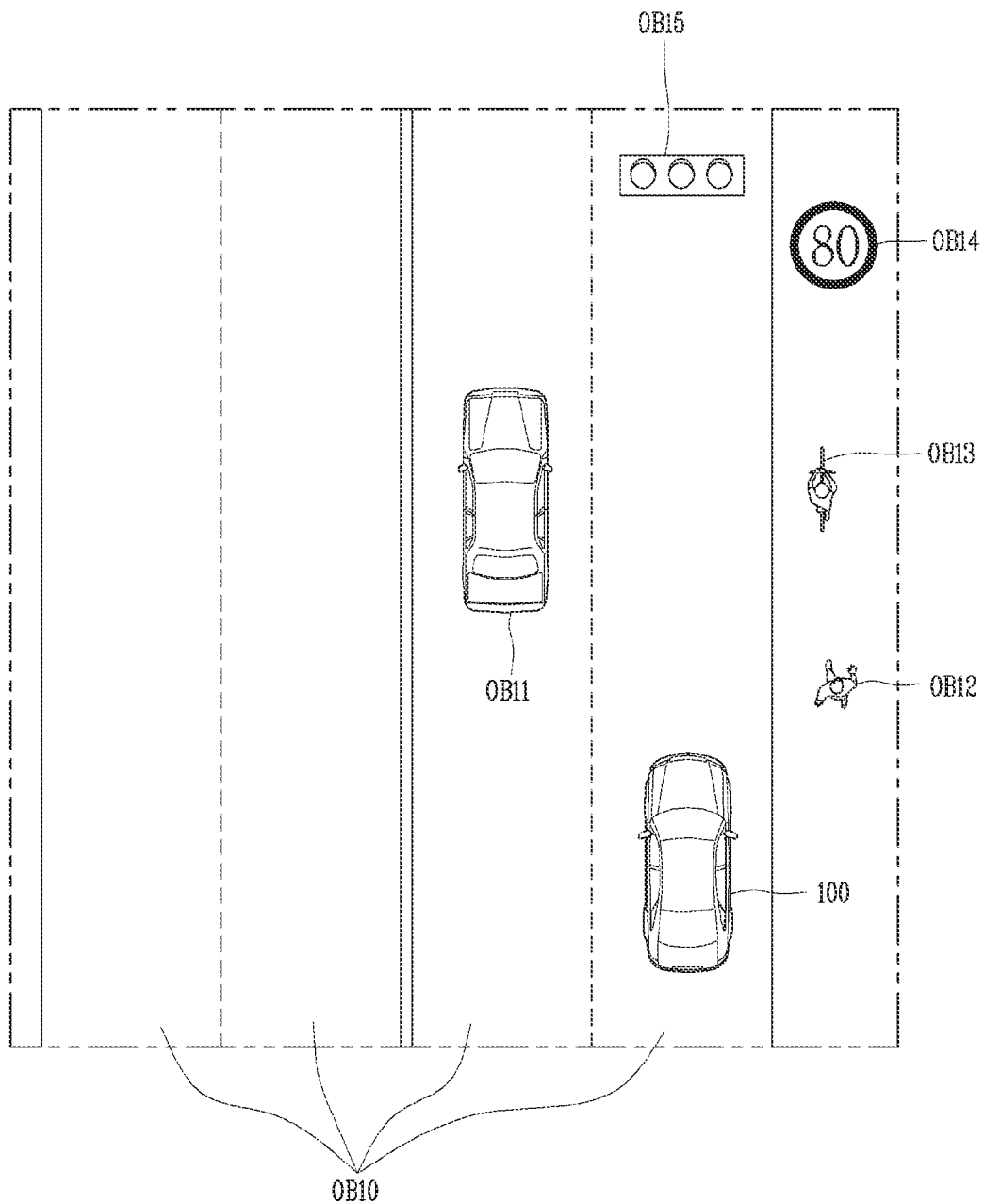
FIGS. 5 and 6 illustrate objects according to an implementation of the present disclosure.
Figure 6:
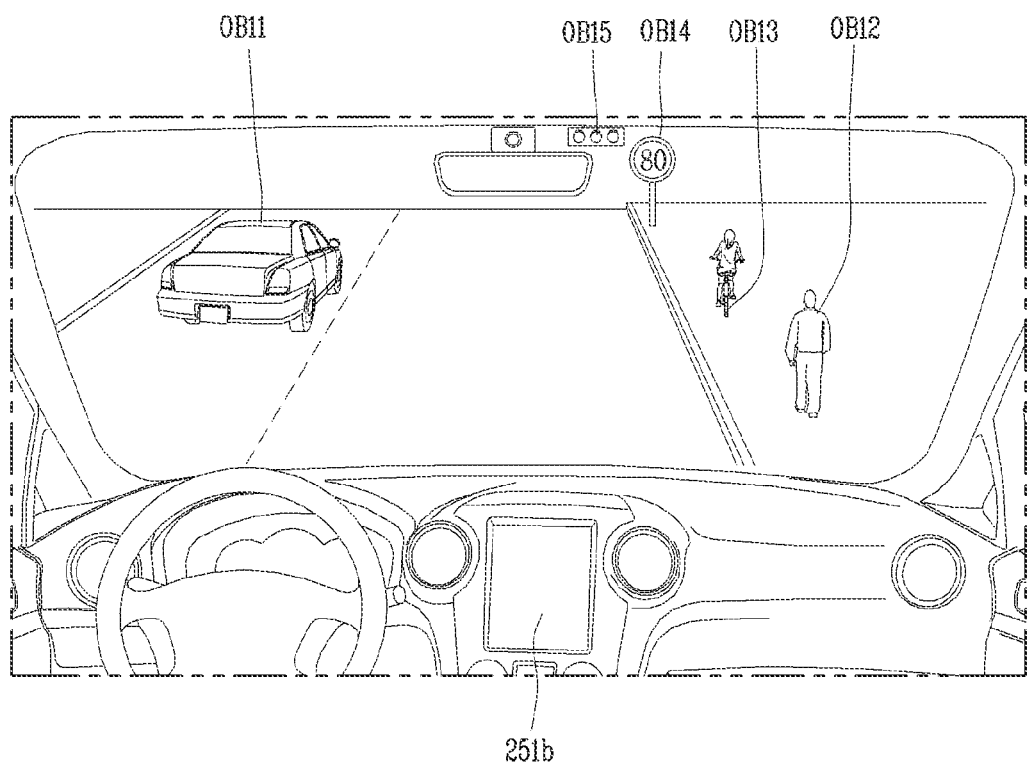

FIGS. 5 and 6 illustrate objects according to an implementation of the present disclosure.

Figure 7:
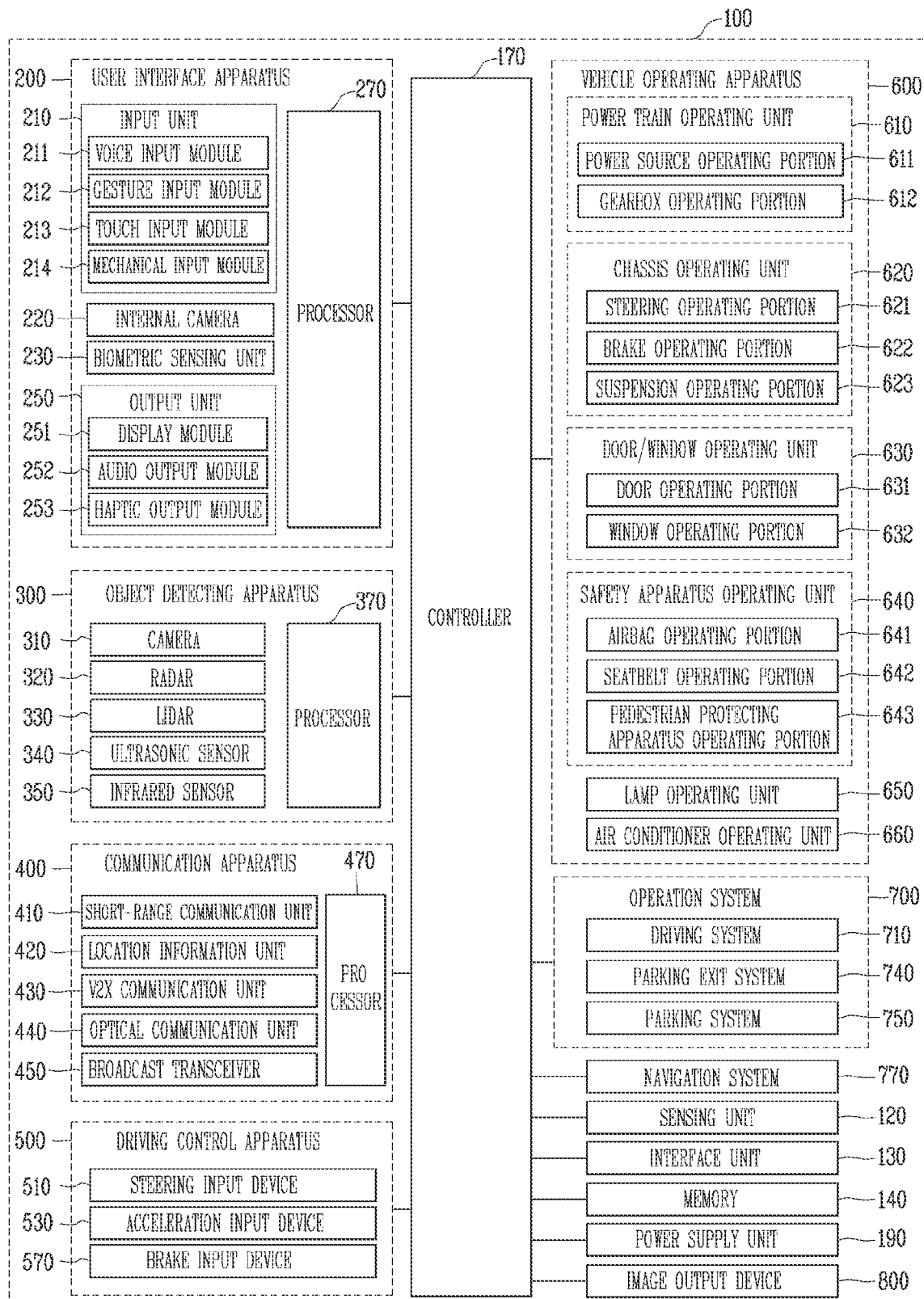
FIG. 7 is a block diagram illustrating components of a vehicle according to an implementation of the present disclosure.

FIG. 7 is a block diagram illustrating components of a vehicle according to an implementation of the present disclosure.

As illustrated in FIGS. 1 to 7, a vehicle 100 may include wheels turning by a driving force, and a steering apparatus 510 for adjusting a driving (proceeding, moving) direction of the vehicle 100.

The vehicle 100 may be an autonomous vehicle.

Here, the autonomous driving is defined as controlling at least one of acceleration, deceleration, and driving direction based on a preset algorithm. In other words, the autonomous driving refers to that a driving control apparatus is automatically manipulated even without a user input applied to the driving control apparatus.

In some implementations, the vehicle 100 may be switched into an autonomous mode or a manual mode based on a user input.

For example, the vehicle 100 may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For instance, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a control unit 170, and a power supply unit 190.

In some implementations, the vehicle 100 may include more components in addition to components described in this specification or may exclude one or more of the components described herein.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250, and a processor 270.

In some implementations, the user interface apparatus 200 may include more components in addition to the components described in this specification or may not include some of those components described herein.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window, or other suitable areas in the vehicle.

The input unit 210 may include an audio (or voice) input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light-emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible, or tactile signal.

The output unit 250 may include at least one of a display module 251, an audio output module 252, and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

The user interface apparatus 200 may also be referred to herein as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving operation of the vehicle 100.

Referring to FIGS. 5 and 6, an object O may include traffic lanes OB10, another vehicle OB11, a pedestrian OB12, a two-wheeled vehicle OB13, traffic signals OB14 and OB15, light, a road, a structure, a speed hump, a terrain, an animal, and the like.

The lane OB01 may be a driving lane, a lane next to the driving lane or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle moving ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB12 may be a motorcycle or a bicycle that is located on a sidewalk or roadway.

The traffic signals may include a traffic light OB15, a traffic sign OB14, and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge, and the like.

The terrain may include a mountain, a hill, and the like.

Meanwhile, objects may be classified into a moving object and a fixed object. For example, the moving object may include another vehicle and a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350, and a processor 370.

According to some implementations, the object detecting apparatus 300 may further include other components in addition to the components described herein, or may not include some of the components described herein.

The camera 310 may be located on an appropriate portion outside the vehicle to acquire an external image of the vehicle. The camera 310 may be a mono camera, a stereo camera 310a, an around view monitoring (AVM) camera 310b, or a 360-degree camera.

For example, the camera 310 may be disposed adjacent to a front windshield within the vehicle to acquire a front image of the vehicle. Alternatively, the camera 310 may be disposed adjacent to a front bumper or a radiator grill.

Alternatively, the camera 310 may be disposed adjacent to a rear glass within the vehicle to acquire a rear image of the vehicle. Alternatively, the camera 310 may be disposed adjacent to a rear bumper, a trunk or a tail gate.

Alternatively, the camera 310 may be disposed adjacent to at least one of side windows within the vehicle to acquire a side image of the vehicle. Alternatively, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed at an appropriate position outside the vehicle for detecting an object which is located at a front, rear, or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed at an appropriate position outside the vehicle for detecting an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed at an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object and the like, based on the reflected electromagnetic wave.

The processor 370 may detect an object based on a reflected laser beam, which is generated when an emitted laser beam is reflected from the object, and track the object. The processor 370 may execute operations, such as a calculation of a distance from the object, a calculation of a relative speed with the object and the like, based on the reflected laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object and the like, based on the reflected ultrasonic wave.

The processor may detect an object based on reflected infrared light, which is generated when emitted infrared light is reflected from the object, and track the object. The processor 370 may execute operations, such as a calculation of a distance from the object, a calculation of a relative speed with the object and the like, based on the reflected infrared light.

According to some implementations, the object detecting apparatus 300 may include a plurality of processors 370 or may not include any processor 370. For example, each of the camera 310, the radar 320, the LiDAR 330, the ultrasonic sensor 340, and the infrared sensor 350 may include a processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal, or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and a processor 470.

According to some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel and a terrestrial channel. The broadcast signal may include a TV broadcast signal, a radio broadcast signal, and a data broadcast signal.

The processor 470 may control an overall operation of each unit of the communication apparatus 400.

According to some implementations, the communication apparatus 400 may include a plurality of processors 470 or may not include the processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. The steering input device 510 may be configured in the form of a wheel allowing a steering input in a rotating manner. In some implementations, the steering input device may be configured as a touch screen, a touch pad, or a button.

The acceleration input device 530 may receive an input for accelerating the vehicle 100 from the user. The brake input device 570 may receive an input for braking the vehicle 100 from the user. Each of the acceleration input device 530 and the brake input device 570 may be, preferably, configured in the form of a pedal. In some implementations, the acceleration input device or the brake input device may be configured as a touch screen, a touch pad, or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described herein, or may not include some of the components described herein.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

When an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642, and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740, and a parking system 750.

According to some implementations, the operation system 700 may further include other components in addition to components to be described herein, or may not include some of the components to be described herein.

Meanwhile, the operation system 700 may include at least one processor. Each unit of the operation system 700 may individually include at least one processor.

In some implementations, the operation system may be implemented by the controller 170 when it is implemented in a software configuration.

According to some implementations, the operation system 700 may be implemented by at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600, and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600, and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600, and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

According to some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. In particular, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an image output device 800 provided in the vehicle 100 will be described in detail.

The image output device 800 that is disposed at the vehicle 100 may be implemented as an independent device detachable from the vehicle 100, or as a component of the vehicle 100 integrally installed in the vehicle 100.

All the operation and control method of the image output device 800 described herein may be alternatively performed by the controller 170 of the vehicle 100. That is, the operation and/or control method performed by a processor 870 of the image output device 800 may be performed by the controller 170 of the vehicle 100.

Figure 8:
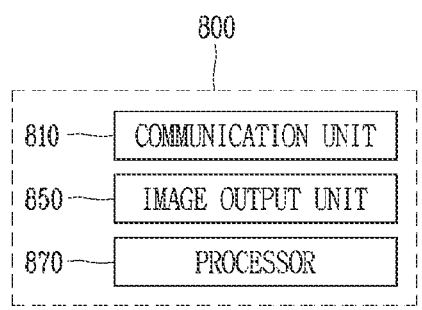
FIG. 8 is a conceptual view illustrating an image output device according to one implementation of the present disclosure.

Referring to FIG. 8, the image output device 800 includes a communication unit 810, an image output unit 850, and the processor 870.

The communication unit 810 is configured to perform communications with the various components described in FIG. 7. For example, the communication unit 810 may receive various information provided through a controller area network (CAN). In another example, the communication unit 810 may perform communications with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic conditions and the like, while communicating with a road infrastructure and other vehicles during driving.

The communication unit 810 may perform communication with one or more devices provided in the vehicle 100.

Further, the communication unit 810 may receive information related to the driving of the vehicle from most of devices provided in the vehicle 100. The information transmitted from the vehicle 100 to the image output device 800 is referred to as 'vehicle driving information (or vehicle travel information)'.

Vehicle driving information includes vehicle information and surrounding information related to the vehicle. Information related to the inside of the vehicle with respect to the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, the number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (e.g., whether or not the user is an authenticated user), and the like.

The surrounding information may also include ambient brightness, a temperature, a position of the sun, information related to a nearby object (a person, another vehicle, a sign, etc.), a type of a driving road surface, a landmark, line information, and driving lane information, and information required for an autonomous travel/autonomous parking/automatic parking/manual parking mode.

In addition, the surrounding information may further include a distance from an object existing around the vehicle to the vehicle 100, a possibility of collision, a type of an object, a parking space for the vehicle, an object for identifying the parking space (e.g., a parking line, a string, another vehicle, a wall, etc.), and the like.

The vehicle driving information is not limited to the examples described above and may include all information generated from the components provided in the vehicle 100.

The image output unit 850 is configured to output various visual information according to the control of the processor 870. The image output unit 850 may output visual information to a windshield of a vehicle or a separately provided screen, or may output visual information through a panel. The image output unit 850 may correspond to the display module 251 described with reference to FIGS. 1 to 7.

For example, visual information output by the image output unit 850 is reflected from the windshield or the screen, giving an impression or effect that the visual information is being displayed on the windshield or the screen. This may allow an occupant or passenger on board to simultaneously check the real world at the outside of the vehicle 100 and a virtual object displayed on the windshield or the screen. Augmented reality can be achieved through the image output unit 850.

The processor 870 performs various operations to be described hereinafter and controls the communication unit 810 and the image output unit 850.

The processor 870 may be configured to control one or more devices provided in the vehicle 100 using the communication unit 810.

More specifically, the processor 870 may determine whether at least one of a plurality of preset or predetermined conditions is satisfied based on vehicle driving information received through the communication unit 810. According to a satisfied condition, the processor 870 may control the one or more displays in different ways.

In association with the preset conditions, the processor 870 may detect an occurrence of an event in an electric component provided in the vehicle 100 and/or an application, and determine whether the detected event meets a preset condition. Here, the processor 870 may detect the occurrence of the event from information received through the communication unit 810.

The application may be implemented, for example, as a widget, a home launcher, and the like, and refer to various types of programs that can be executed on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD), a curve speed warning (CSW), and a turn-by-turn navigation (TBT).

For example, the occurrence of the event may be a missed call, presence of an application to be updated, a message arrival, start on, start off, autonomous travel on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For instance, the occurrence of the event may be an occurrence of forward collision warning, an occurrence of a blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

For example, when a generated event satisfies the preset condition, the processor 870 may control the communication unit 810 to display information corresponding to the satisfied condition on one or more displays provided in the vehicle.

The processor 870 may transmit an autonomous driving message to at least one of a plurality of devices provided in the vehicle 100 to enable autonomous driving of the vehicle 100. For example, an autonomous driving message may be transferred to a brake for decelerating the vehicle 100, or to a steering device for changing a driving direction.

Figure 9:
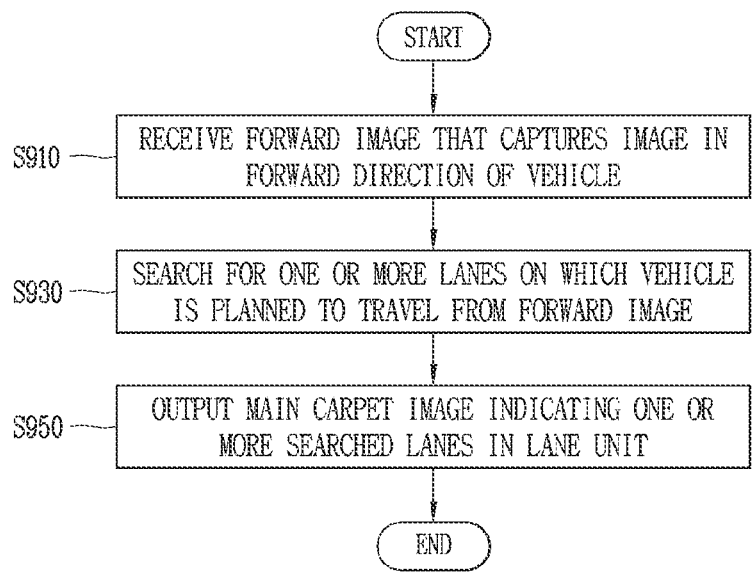
FIG. 9 is a flowchart illustrating a method for controlling an image output device.
Figure 10A:
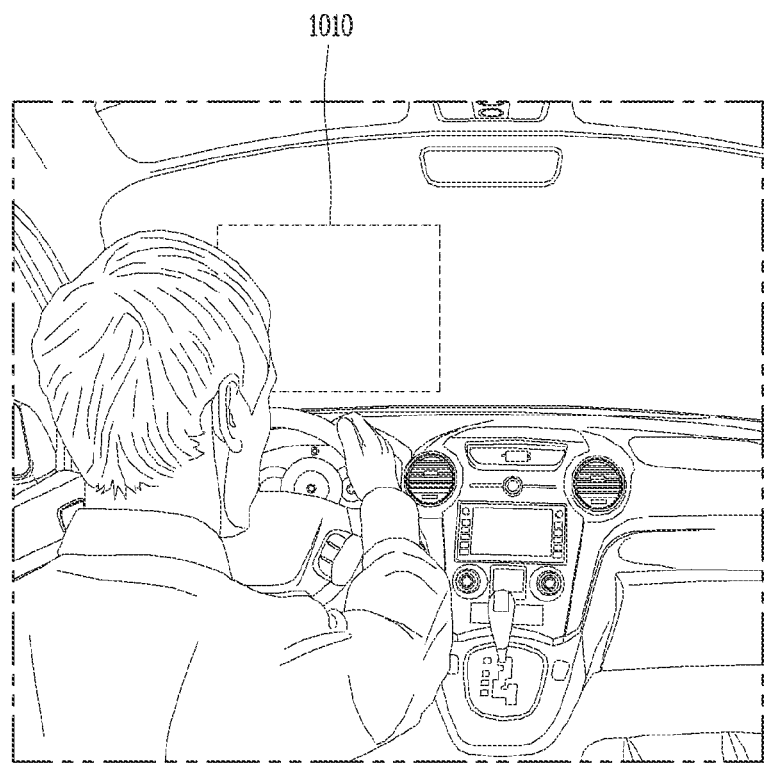
FIGS. 10A and 10B are conceptual views illustrating the control method of FIG. 9.
Figure 10B:
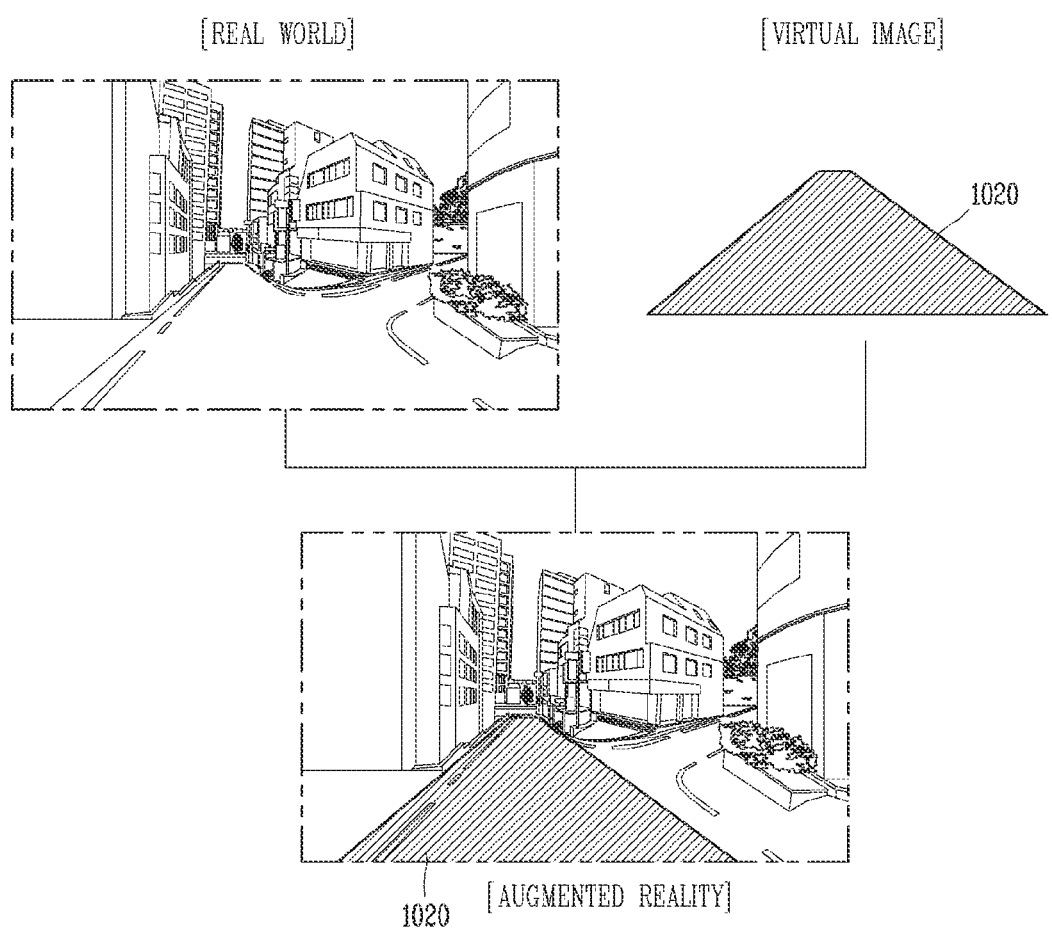

FIG. 9 is a flowchart illustrating a method for controlling an image output device, and FIGS. 10A and 10B are conceptual views illustrating the control method of FIG. 9.

The processor 870 receives a forward (or front) image that captures an image in a forward direction (or ahead) of the vehicle 100 (S910).

The forward image may be received through the communication unit 810 and include one or more images.

Next, the processor 870 retrieves one or more lanes on which the vehicle 100 is expected or planned to travel from the forward image (S930).

For convenience of description, the one or more lanes on which the vehicle 100 is expected to travel will be referred to as a 'planned driving lane'.

The planned driving lane may refer to a lane on which the vehicle 100 is expected to travel until a time point which is a positive real number, based on a current time point. The may vary according to a speed of the vehicle 100, characteristics of a road on which the vehicle 100 is traveling, and a speed limit on a road on which the vehicle 100 is traveling.

When the vehicle 100 is driven by autonomous driving, the planned driving lane may refer to a lane to be driven by autonomous driving. When the vehicle 100 is driven manually, the planned driving lane may refer to a lane recommended to a driver.

The processor 870 may specify the planned driving lane based on path or route navigation information for a destination set in the vehicle 100. The route navigation information may be generated by the processor 870 or received from another device through the communication unit 810.

In order to search for the planned driving lane, the processor 870 may receive a high-definition map (HD map) from a path or route providing device, a navigation device (or navigator), and/or a server, so as to receive vehicle driving information for specifying the planned driving lane.

More specifically, the processor 870 may receive forward path or route information guiding a road ahead of the vehicle 100 in lane units (or lane-by-lane).

The forward route information may provide a driving (or traveling) route to a destination for each lane drawn on the road, which may be route information in accordance with the ADASIS protocol.

The forward route information may be provided by subdividing a route, on which the vehicle should travel or can travel, into lane units. The forward route information may be information for guiding a driving route to a destination in lane units. When the forward path information is displayed on a display mounted on the vehicle 100, a guide line for guiding a lane on which the vehicle 100 can travel may be displayed on the map. In addition, a graphic object indicating the location of the vehicle 100 may be included on at least one lane in which the vehicle 100 is located among a plurality of lanes included in the map.

For example, when the road ahead of the vehicle 100 is an 8-lane road, and the planned driving lane is a second lane, the processor 870 may search for the second lane in the forward image.

As another example, when the road ahead of the vehicle 100 is an 8-lane road, and the vehicle 100 is planned to travel on a second lane from the current point or location to 50 m ahead and then move to a third lane, the processor 870 may search for the second lane up to 50 m ahead and the third lane after the 50 m ahead in the forward image.

Here, searching for a lane may refer to searching for a partial area including the planned driving lane in the entire area of the forward image. This is to allow an occupant on board the vehicle 100 to intuitively recognize the planned driving lane by displaying a carpet image indicating the planned driving lane superimposed or overlaid on the searched partial area.

Next, the processor 870 outputs a main carpet image indicating the one or more searched lanes in lane units through the image output unit 850 (S950).

As illustrated in FIG. 10A, the processor 870 sets an image display area 1010 to output visual information based on an eye position and/or gaze of an occupant.

Further, the processor 870 determines at least one of a position, size, and shape of a main carpet image 1020 based on the occupant's eye position and/or gaze. At least one of the position, size, and shape of the main carpet image displayed on the windshield or the screen may be changed according to the occupants' eye position and/or gaze. This is to provide augmented reality where the real world and a virtual image are perfectly matched.

The main carpet image indicating the planned driving lane may overlap the planned driving lane and be a transparent image with a predetermined color.

The predetermined color may vary according to a reference or criterion. For example, in the case of a general road, the main carpet image may be a first color, but when snow is accumulated on the road, the main carpet image may be a second color that is different from the first color.

Through the main carpet image, path or route information regarding a planned driving lane on which the vehicle 100 driven by autonomous driving or by the driver is expected to travel may be provided to the occupant on board in lane units.

Meanwhile, the processor 870 may provide one or more sub carpet images, which can be selected by the occupant, in addition to the main carpet image.

Figure 11:
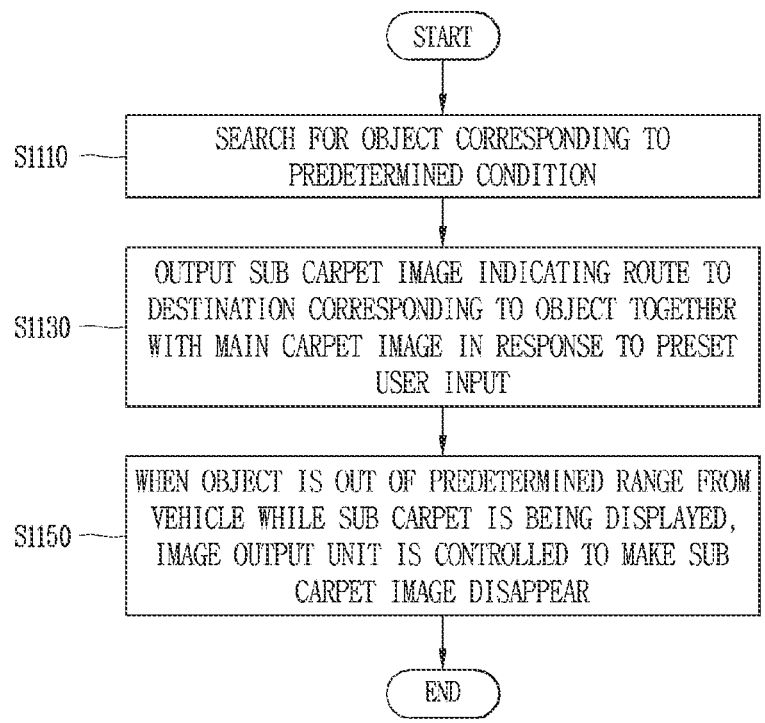
FIG. 11 is a flowchart illustrating a method for controlling an image output device outputting a sub carpet image.
Figure 12:
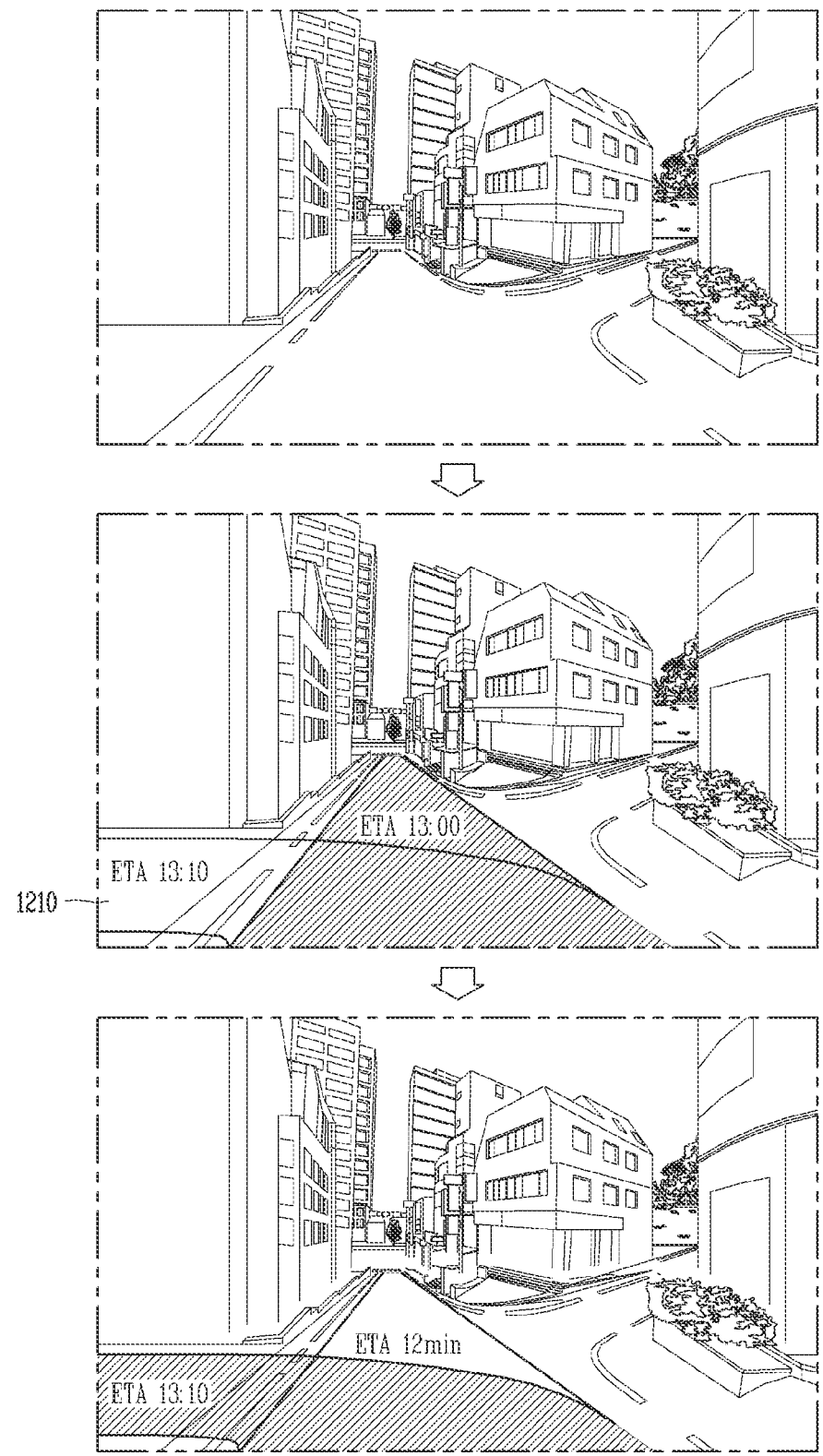
FIGS. 12, 13, and 14 are views illustrating examples of the control method of FIG. 11.
Figure 13:
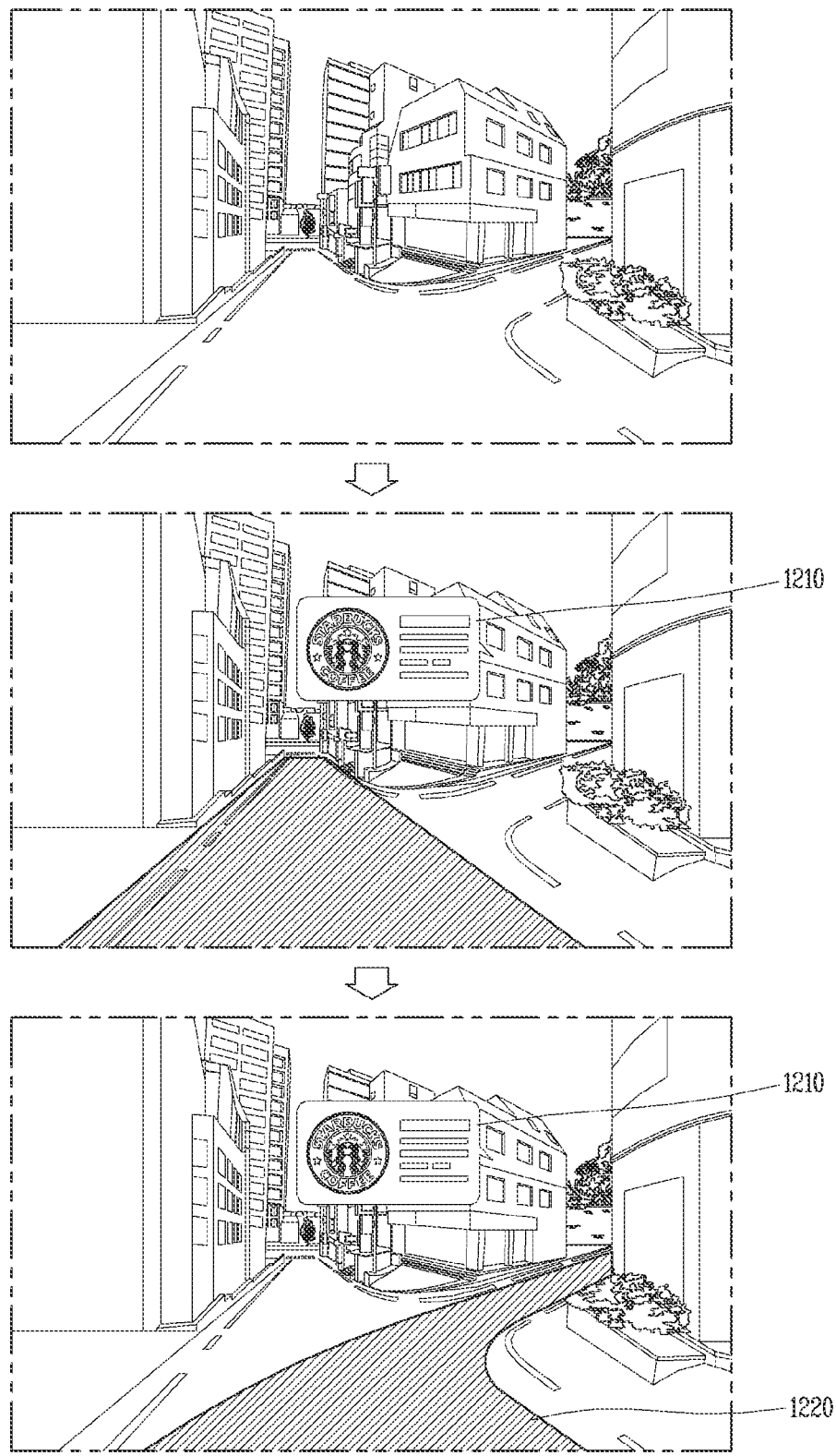
Figure 14:
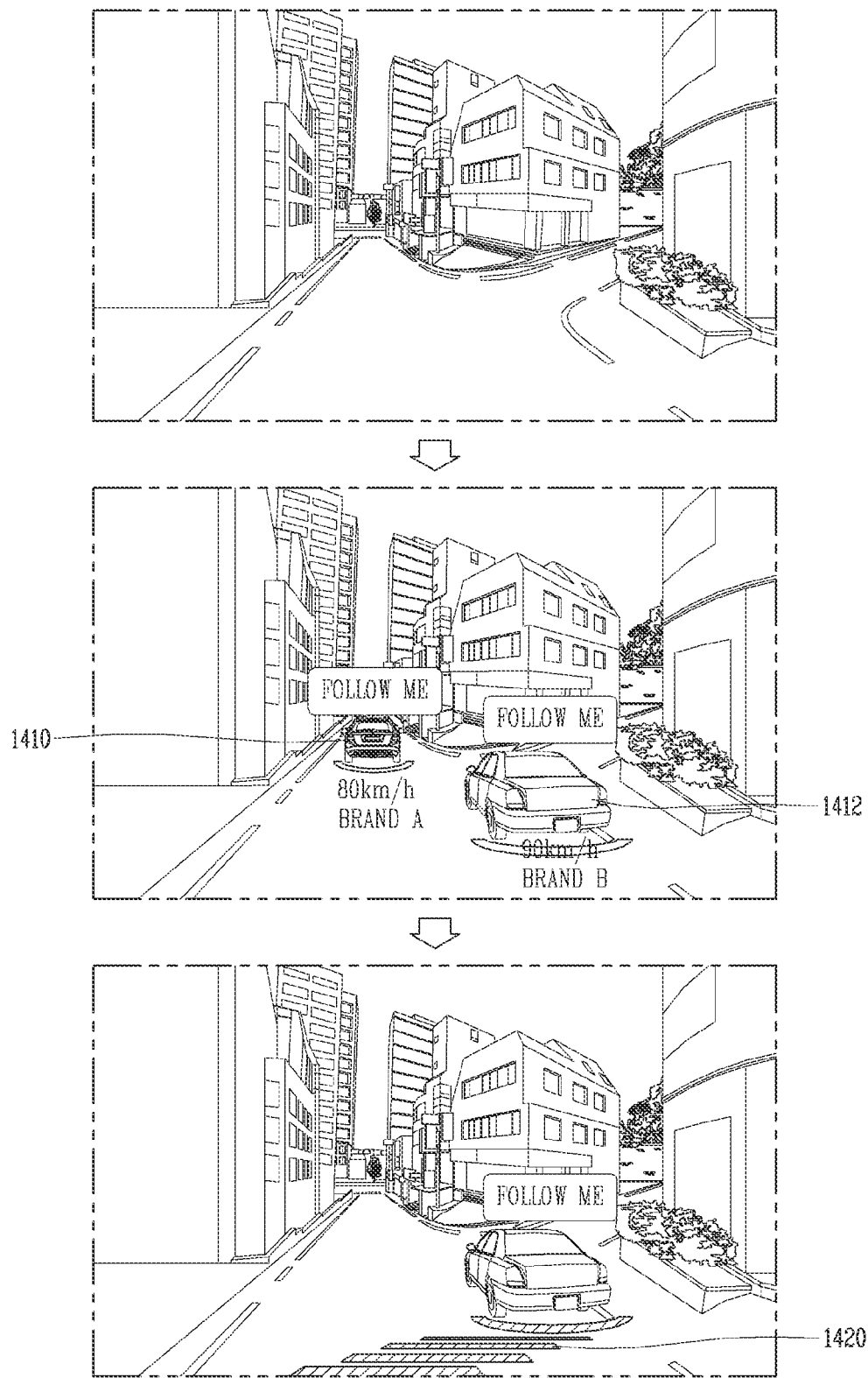

FIG. 11 is a flowchart illustrating a method for controlling an image output device outputting a sub carpet image, and FIGS. 12, 13, and 14 are views illustrating examples of the control method of FIG. 11.

The processor 870 searches for an object corresponding to a preset or predetermined condition (S1110).

Here, the preset condition may include various conditions. In other words, the preset condition may vary according to implementations.

For example, as illustrated in FIG. 12, a detour road, which is a faster route to a destination than a main route guided by the main carpet image, may be searched for the object. A detour road requires less charges or fees for road use than the main route, or a detour road that is more comfortable or easier to drive on than the main route may be searched for the object.

As another example, as illustrated in FIG. 13, the processor 870 may search for a point of interest (POI) set as the object by the occupant. The POI may be limited to objects located ahead of the vehicle 100 within a predetermined range with respect to the vehicle 100. Examples of the POI may include a parking lot, a movie theater, a restaurant, and the like, and the POI may vary according to an occupant on board the vehicle 100.

As another example, as illustrated in FIG. 14, the processor 870 may search for other vehicles ahead within a predetermined range from the vehicle 100 as the object. Here, the other vehicles may be limited to objects located ahead within a predetermined range with respect to the vehicle 100. The other vehicles may be vehicles that can be followed and have approved for communication with the vehicle 100. In other words, vehicles without an approval for communication are not searched for the other vehicles.

The processor 870 may control the image output unit 850 such that an object image indicating the object is output in response to the object searched.

For example, when the object is a thing, a boundary line surrounding an edge of the thing may be output as the object image. The object image allows an occupant on board to visually confirm what the searched object is.

In addition, the processor 870 may collect object information corresponding to the object and control the image output unit 850 to output the object information.

For example, as illustrated in FIG. 12, when the object is a detour route, information such as a time taken to reach a destination when traveling on the detour route, an estimated arrival time to the destination, the amount of fuel to be consumed, and the like can be collected as the object information.

As another example, as illustrated in FIG. 13, when the object is a point of interest (POI) 1210, at least one of an event provided by the POI 1210, and an address, contact number, name, and trademark of the POI 1210 may be collected as the object information. The processor 870 may request object information regarding the POI 1210 to a server and output the object information received from the server through the image output unit 850.

As another example, as illustrated in FIG. 14, when the object is other vehicles 1410 and 1412, at least one of a type, speed, and destination of the other vehicles may be collected. Here, the processor 870 may perform V2X communication with another vehicle and receive another vehicle information from the another vehicle. In addition, the processor 870 may transmit an image of the another vehicle to a server and receive the another vehicle information from the server.

Further, the processor 870 may calculate fuel efficiency when the vehicle 100 follows the another vehicle, and collect the fuel efficiency as the object information. The processor 870 may calculate fuel efficiency when the vehicle 100 follows the another vehicle, and control the image output unit 850 such that the fuel efficiency is output together with the main carpet image and the sub carpet image.

Next, in response to a preset or predetermined user input, the processor 870 may output a sub carpet image indicating a route to a destination corresponding to the object together with the main carpet image (S1130).

The preset user input may include various user inputs.

For instance, it may be a voice command input through a microphone provided in the vehicle 100. It may be input through a natural language used to communicate with artificial intelligence. For example, when a natural language such as "A left turn would be faster?" is input, the processor 870 may search for a detour route after the left turn and output a sub carpet image indicating the searched detour route in lane units together with the main carpet image.

As another example, the preset user input may be a user input by manipulating a jog dial provided in the vehicle 100 in a predetermined manner, or through a predetermined gesture or a predetermined touch input.

The preset user input is a request for another route different from the main route guided by the main carpet image, which may be variously modified according to implementations.

The processor 870 searches for a route to a destination corresponding to the object. In order to distinguish it from the main route guided by the main carpet image, a route guided by the sub carpet image will be referred to as a 'sub route (or path)'. That is, the processor 870 searches for a sub route to a destination corresponding to the object, and the sub carpet image guides the sub route in lane units.

As illustrated in 12, when the object is a detour route, a sub carpet image 1220 indicating the detour route in lane units may be output.

As illustrated in FIG. 13, when the object is a point of interest (POI) 1310, the processor 870 may search for a sub route to a destination, which is a place to park the vehicle 100 at the POI 1310, in lane units, and output a sub carpet image 1320 corresponding to the sub route.

As illustrated in FIG. 14, when the object is other vehicles 1410 and 1412, the processor 870 may search for sub routes following the other vehicles 1410 and 1412 in lane units, and output sub carpet images 1420 and 1422 corresponding the sub routes.

When the object is another vehicle, the processor 870 controls the image output unit 850 such that at least one of a size, shape, and location of a sub carpet image is changed according to a location of the another vehicle. For example, when the another vehicle changes a lane, the sub carpet image may be updated to guide the vehicle 100 to move to the lane in which the another vehicle is currently located.

When there are a plurality of objects corresponding to the preset condition, the processor 870 may control the image output unit 850 such that a plurality of sub carpet images are output along with the main carpet image. When the plurality of sub carpet images are displayed, the sub carpet images may have different colors from each other according to objects that correspond to the sub carpet images, respectively.

When the number of objects corresponding to the preset condition is greater than a criterion number (or reference), the processor 870 may filter the number of objects to be the same as the criterion number based on a preset or predetermined reference. For example, when the number of searched objects is ten and the criterion number is three, the processor 870 selects (or filters) three objects from the ten objects. When filtering is done, the criterion number of sub carpet images are output together with a main carpet image.

A criterion or reference for filtering may be a gaze of an occupant on broad the vehicle 100. For example, a partial area of a predetermined size that the occupant is seeing may be extracted from the forward image, and an object located in the partial area may be selected. Alternatively, a location or place at which the occupant is looking may be extracted, and objects may be selected in order of proximity to the place as many as a criterion number.

The processor 870 may collect a degree or level of traffic congestion of a route to a destination corresponding to the object, and control the image output unit 850 such that the sub carpet image has a different color according to the level of traffic congestion.

For example, a level of traffic congestion may be calculated as a number. When the level of traffic congestion is within a first range, the sub carpet image may have a first color, and when the level of traffic congestion is within a second range, the sub carpet image may have a second color.

The main carpet image may be a transparent image of a first color, and the sub carpet image may be a transparent image of a second color. Here, the processor 870 may search for a portion where the main carpet image and the sub carpet image overlap, and control the image output unit 850 such that the portion has a third color mixed with the first color and the second color. The overlapping portion changes as the vehicle 100 travels or moves.

When the object is another vehicle, the processor 870 may calculate fuel efficiency when following the another vehicle, and control the image output unit 850 such that the sub carpet image had a different color according to the fuel efficiency.

The processor 870 may output the sub carpet image when an object corresponding to the preset condition is searched without the preset user input.

Next, when the object is located out of a predetermined range with respect to the vehicle 100 while outputting the sub carpet image, the processor 870 may control the image output unit 850 to make the sub carpet image disappear (S1150).

As the vehicle 100 and/or the object moves, the object may be located within or out of a predetermined range from the vehicle 100. The sub carpet image is output when the object is located within the predetermined range. However, the output of the sub carpet image is limited or restricted when the object is located out of the predetermined range. That is, the sub carpet image disappears from the image display area.

Figure 15:
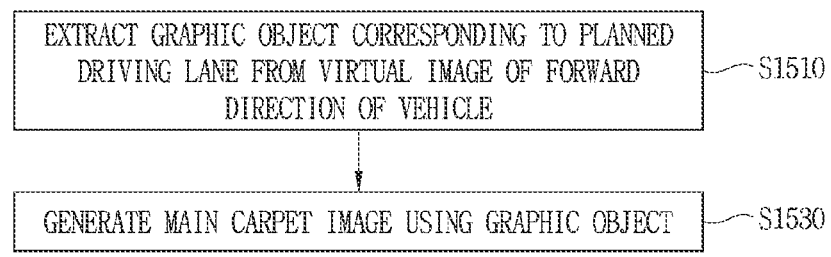
FIG. 15 is a flowchart illustrating a method for controlling an image output device according to one implementation of the present disclosure.
Figure 16A:
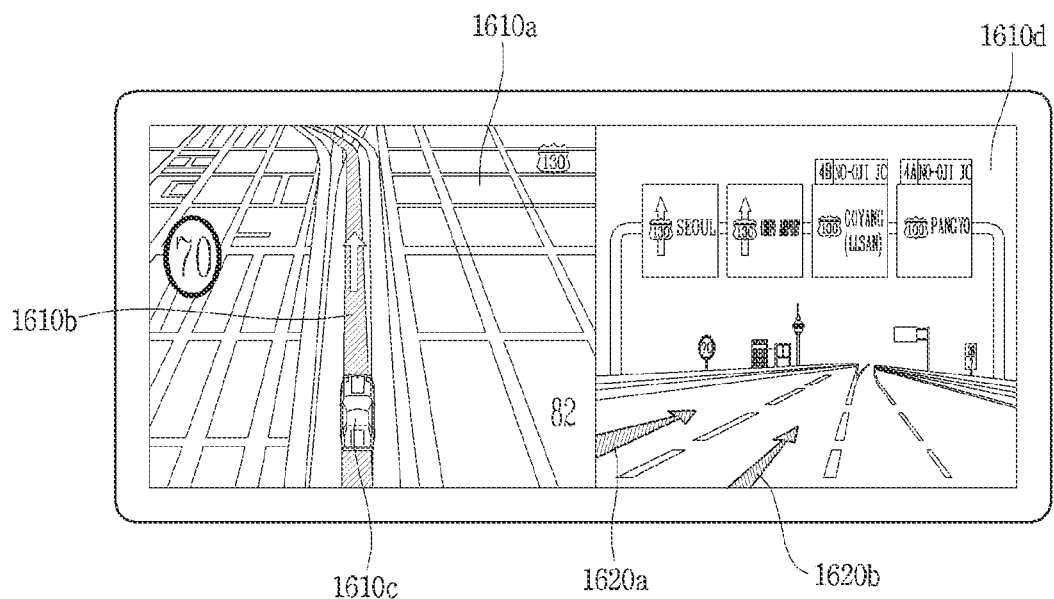
FIGS. 16A and 16B illustrate examples of the control method of FIG. 15.
Figure 16B:
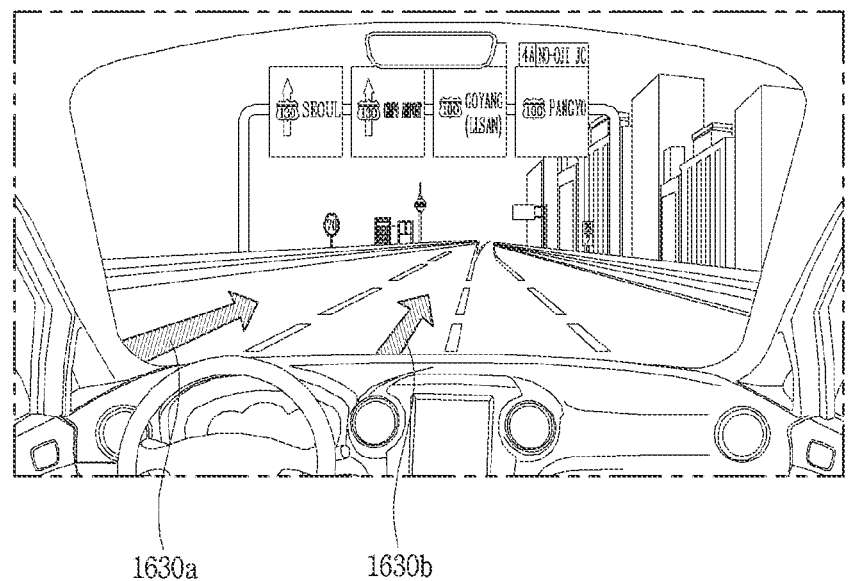

FIG. 15 is a flowchart illustrating a method for controlling an image output device according to one implementation of the present disclosure, and FIGS. 16A and 16B illustrate examples of the control method of FIG. 15.

The processor 870 may receive route navigation information through the communication unit 810.

The route navigation information may include a virtual image of a forward direction of the vehicle 100. For example, as illustrated in FIG. 16A, route navigation information 1610 output from a navigation device may be transmitted to the processor 870 through the communication unit 810. In addition, the route navigation information may include at least one of a map image 1610*a*, a route image 1610*b* indicating a route of the vehicle on the map, a vehicle image 1610*c* indicating a location of the vehicle on the route, and a virtual image 1610*d* of the forward direction of the vehicle reproduced by computer graphics.

The virtual image 1610*d* is used to allow the driver to intuitively recognize a lane to drive on in a complicated section where a ramp section, an intersection, an overpass, or the like is located. For example, as illustrated in FIG. 16A, when the vehicle needs to move in a direction to Wisconsin in a condition that first and second lanes of a 4-lane road lead to Wisconsin, and third and fourth lanes of the 4-lane road lead to St. Louis, the virtual image 1610*d* of reproducing a corresponding road in computer graphics may be displayed. The virtual image 1610*d* may include at least one of graphic objects 1620*a* and 1620*b* indicating that a lane on which the vehicle should travel is the first lane or the second lane.

Route navigation information provided by a navigation device and the like only offers a highlight on a recommended lane for the driver. For example, when a driving lane of the vehicle is a first lane and a recommended lane is a third lane, the third lane is only highlighted on route navigation information. That is, the recommended lane is only provided regardless of the driving lane of the vehicle.

In order to increase driving convenience of the driver, route navigation needs to take a driving lane of the vehicle into consideration.

To this end, the processor 870 may extract a graphic object corresponding to a planned driving lane from a virtual image of a forward direction of the vehicle (S1510), and generate a main carpet image using the graphic object (S1530).

Since a virtual image is a reproduction of the real world, it contains substantially the same information as a forward image. More specifically, although at least one of a point of angle, a scale, and a point of view is different, the forward image and the virtual image may be matched as one through coordinate system transformation or the like.

When matched to one, a graphic object included in the virtual image may be extracted and merged (synthesized or combined) into the forward image. Augmented reality can be realized by extracting graphic objects included in a virtual image and apply them to a forward image.

For example, graphic objects 1620*a* and 1620*b* are extracted from the virtual image 1610*d* illustrated in FIG. 16A, and the processor 870 uses the graphic objects 1620*a* and 1620*b* to generate main carpet images 1630*a* and 1630*b* shown in FIG. 16B. The main carpet images 1630*a* and 1630*b* may be output in a HUD manner, or merged into the forward image to be displayed on a display. The processor 870 may merge the main carpet image into the forward image to be output through the image output unit 850.

More specifically, the processor 870 may calculate a matching condition for matching the forward image and the virtual image, and generate the main carpet image by changing the graphic objects based on the matching condition.

Here, the matching condition may be a coordinate system transformation matrix for converting the virtual image into a coordinate system of the forward image. At least one of a point of angle, scale, and point of view of the virtual image may be changed according to the matching condition, and graphic objects extracted from the virtual image may be applied to the forward image.

The processor 870 may calculate a similarity between the virtual image and the forward image, and control the image output unit 850 such that the main carpet image is output from a point in time when the similarity is higher (or greater) than a reference. The similarity means whether or not matching is possible, and a main carpet image is provided from a point in time when matching of a virtual image and a forward image is available. This is to increase the accuracy of information provided by a main carpet image.

Figure 17:
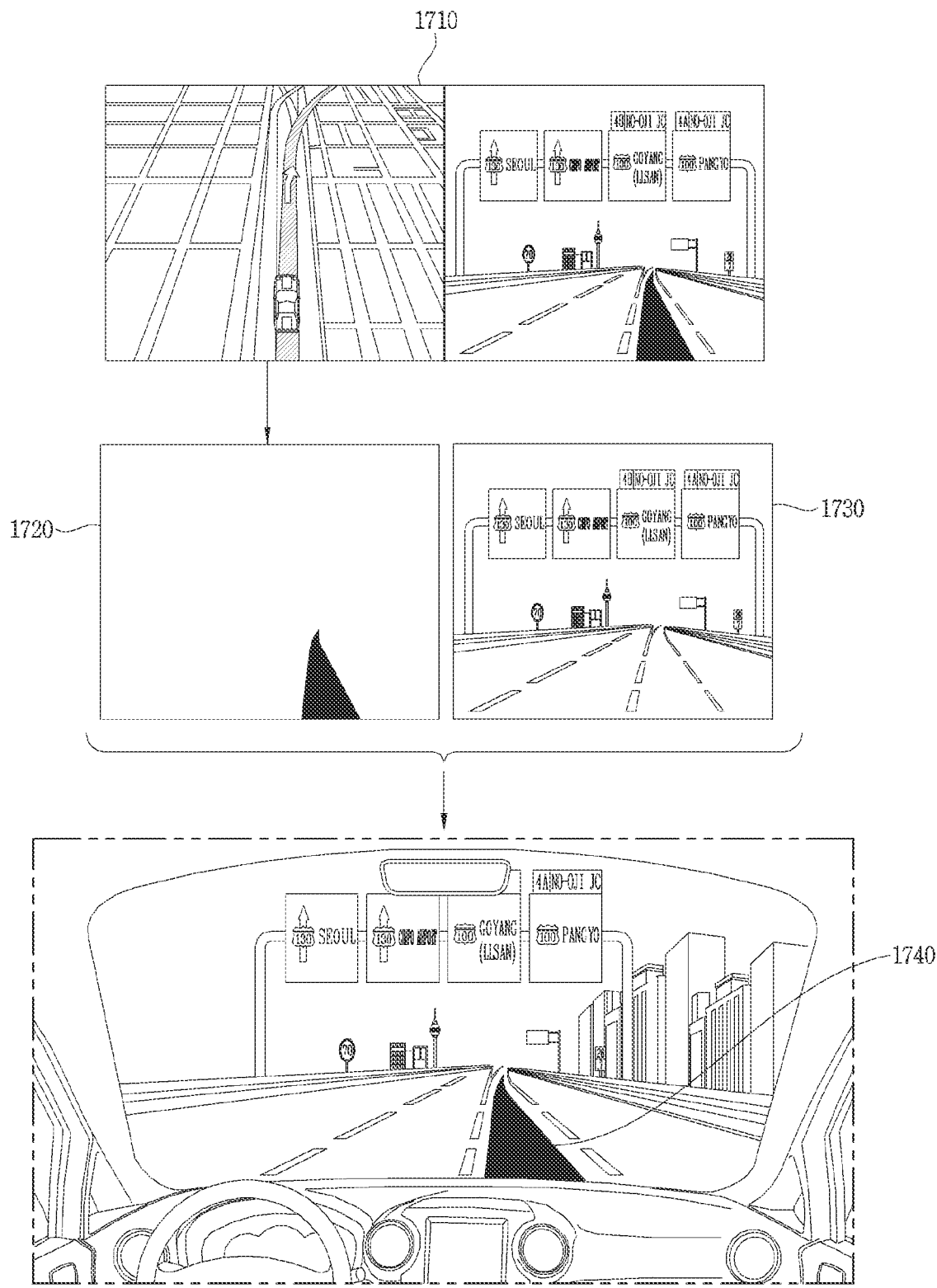
FIG. 17 is a conceptual view illustrating a method of providing a main carpet image using a graphic object extracted from road navigation information.
Figure 18:
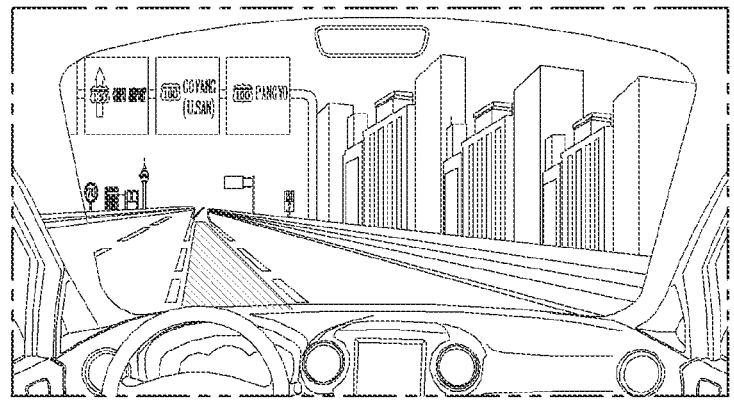
FIG. 18 is a conceptual view illustrating a method of generating a main carpet image based on a driving lane on which a vehicle is traveling by using the graphic object of FIG. 17.
Figure 18:
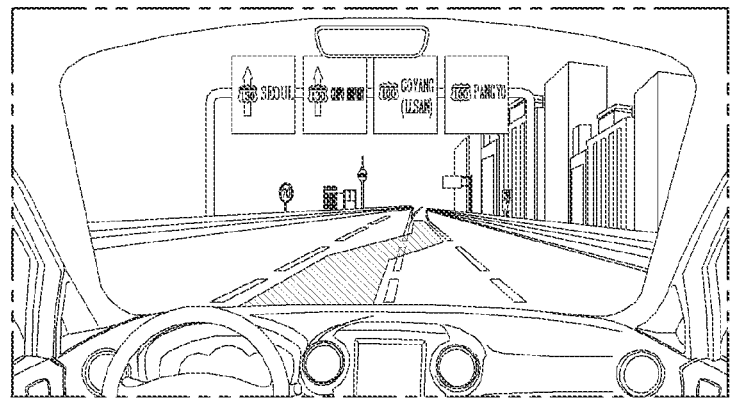
Figure 18:
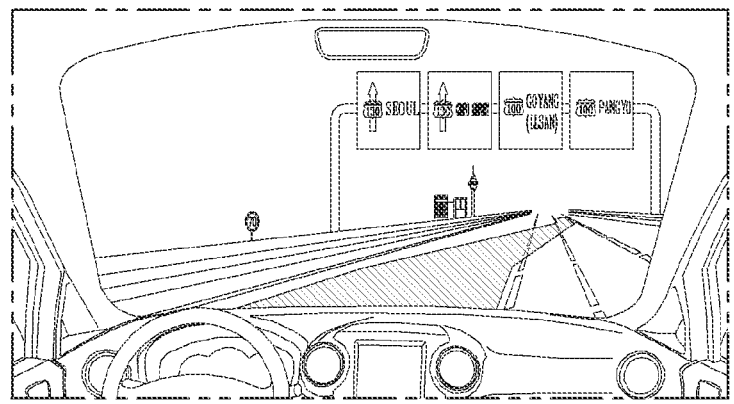

FIG. 17 is a conceptual view illustrating a method of providing a main carpet image using a graphic object extracted from road navigation information, and FIG. 18 is a conceptual view illustrating a method of generating a main carpet image based on a driving lane on which a vehicle is traveling by using the graphic object of FIG. 17.

Referring to FIG. 17, the processor 870 extracts a graphic object 1720 corresponding to a planned driving lane from a virtual image included in road navigation information 1710. In addition, a main carpet image 1740 is generated by changing the graphic object 1720 based on a forward image 1730. The generated main carpet image 1740 may be output through the image output unit 850, and a planned driving lane may be provided to the driver through augmented reality.

For example, as illustrated in FIG. 17, a graphic object corresponding to a planned driving lane may be located on a third lane of a 5-lane road. The processor 870 may calculate a matching condition for matching a virtual image and a forward image, and change the graphic object according to a calculated condition. The processor 870 may generate a main carpet image by using a graphic object whose coordinate system is converted according to a matching condition, so as to output the generated main carpet image.

As another example, as illustrated in FIG. 18, the processor 870 may change a main carpet image based on a driving lane on which the vehicle is traveling. The processor 870 may generate a main carpet image using a graphic image whose coordinate system is converted by a matching condition, based on at least one of a driving lane on which the vehicle is traveling and a driving speed.

Figure 19:
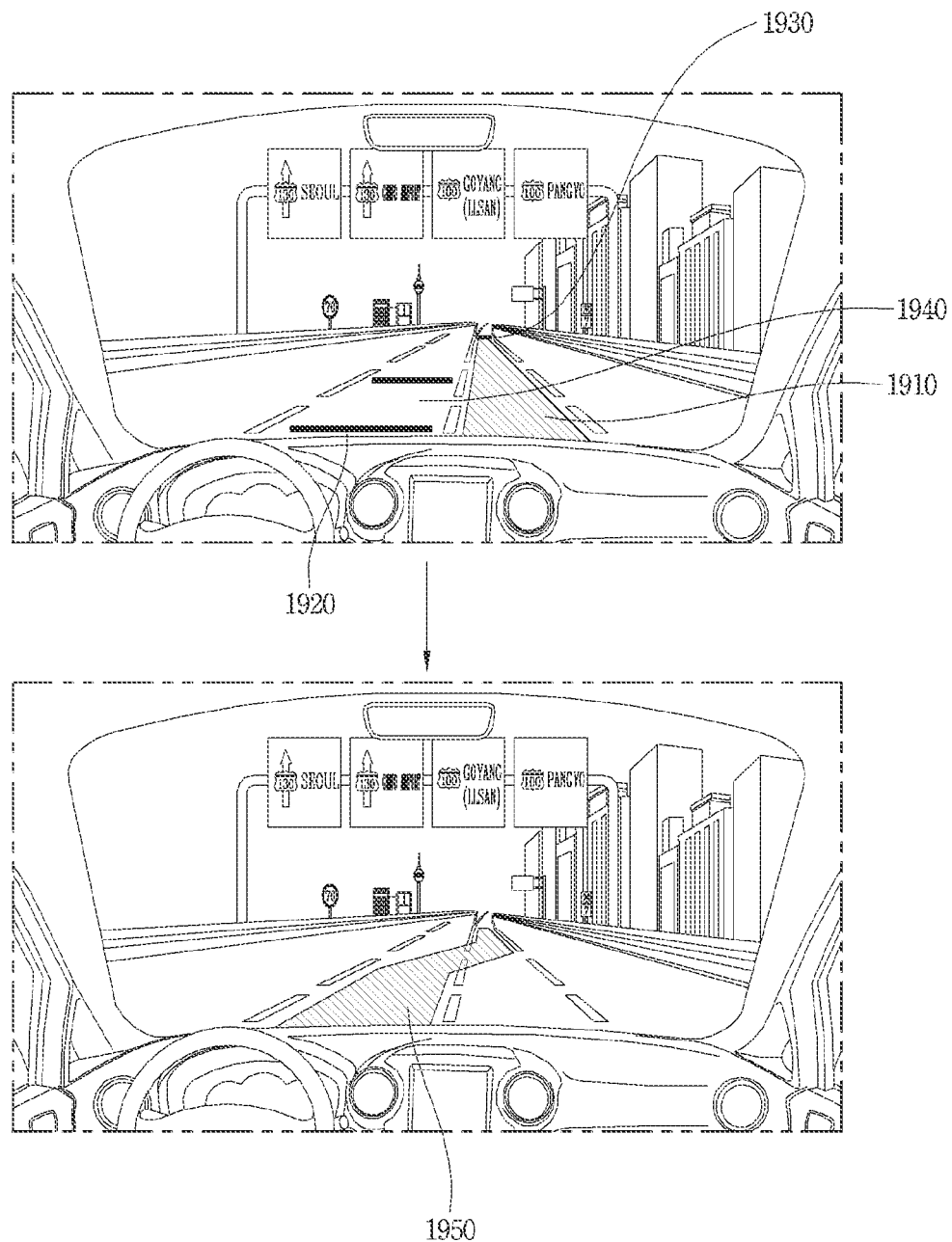
FIG. 19 is a conceptual view illustrating a method of generating a main carpet image in more detail.

FIG. 19 is a conceptual view illustrating a method of generating a main carpet image in more detail.

The processor 870 may match a forward image and a virtual image. A graphic object 1910 may be located on a forward image by the matching, and the processor 870 may obtain pixel information that can specify a location of a graphic object.

The processor 870 may extract a start pixel 1920 corresponding to a current location of the vehicle in the forward image and an end pixel 1930 corresponding to one end of the graphic object included in the virtual image.

The processor 870 may calculate a junction where the vehicle has to make a lane change based on a speed of the vehicle, and extract a junction pixel 1940 corresponding to the junction. A main carpet image 1950 may be generated using pixels connecting the start pixel 1920, the junction pixel 1940, and the end pixel 1930.

Figure 20:
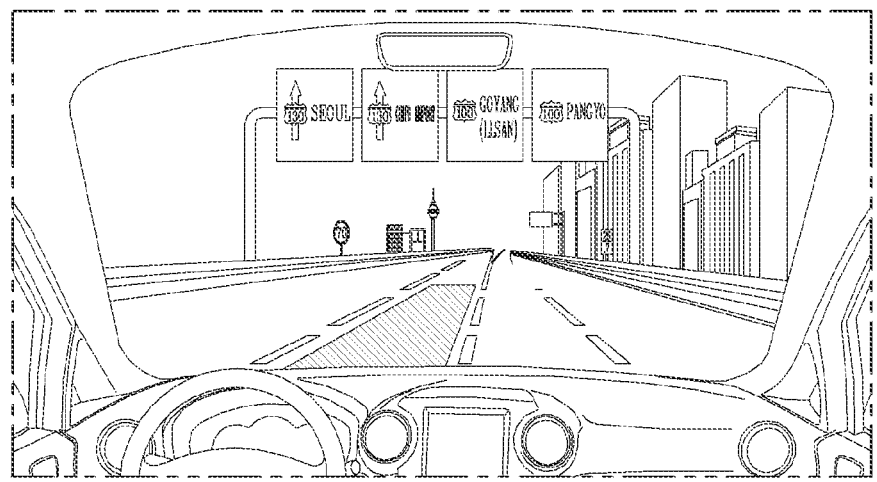
FIG. 20 is a conceptual view illustrating a method of providing a main carpet image by using a sign included in a forward image.
Figure 20:
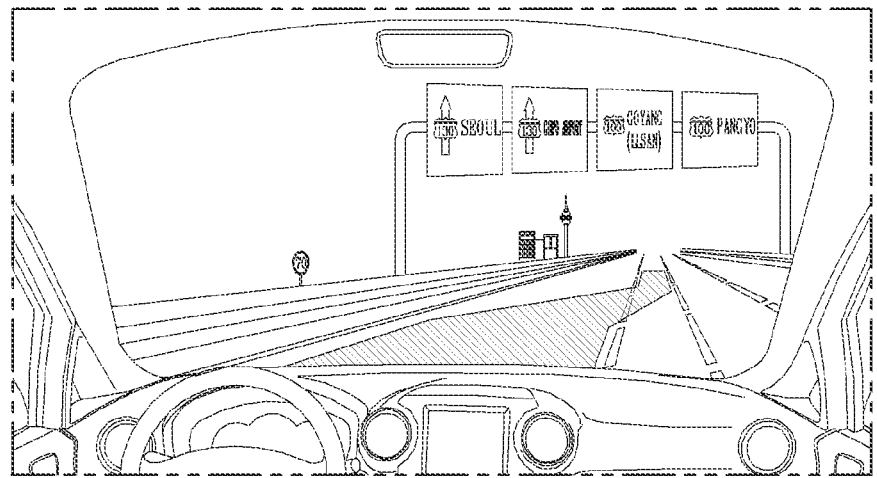

FIG. 20 is a conceptual view illustrating a method of providing a main carpet image by using a sign included in a forward image.

The processor 870 may extract a sign from the forward image and search for the planned driving lane by using at least one of a character (or letter) and a symbol included in the sign.

The processor 870 may obtain road information on which the vehicle is to travel from route navigation information. For example, as illustrated in FIG. 20, the processor 870 acquires road information for the vehicle to travel, such as Interstate 55 (I-55) and St. Louis, from the route navigation information, and search for a corresponding sign from a forward image.

The processor 870 may specify a planned driving lane by using at least one of a character and a symbol included in the sign.

Further, the processor 870 may search for a partial area that the sign is captured or taken from the forward image, and calculate at least one of a position of the sign and a shooting angle based on a front camera that captured the forward image based on the searched partial area.

The processor 870 may change a main carpet image based on calculated information. More specifically, the processor 870 may 3D rotate the main carpet image based on at least one of a position of the sign and a shooting angle. This is to further enhance the 3D effect of the main carpet image provided in augmented reality.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An image output device disposed at a vehicle to enable augmented reality, the image output device comprising:
 an image output unit configured to output visual information for realizing the augmented reality;
 a communication unit configured to receive a forward image that captures an image in a forward direction of the vehicle; and
 a processor configured to search for at least one planned driving lane on which the vehicle is planned to travel from the forward image and control the image output such that a main carpet image indicating the planned driving lane is output in lane units,
 wherein the processor is further configured to:
  control the image output unit to output the main carpet image overlapped with the planned driving lane,
  extract a sign from the forward image and search for the planned driving lane based on at least one of a character or a symbol included in the sign,
  acquire road information regarding planned travel of the vehicle,
  search, based on the sign, for at least one of the character or the symbol corresponding to the road information,
  specify the planned driving lane based on at least one of the character or the symbol included in the sign corresponding to the road information, and
  change the main carpet image based on the specified planned driving lane.

2. The image output device of claim 1, wherein the processor is configured to specify the planned driving lane based on route navigation information guiding a destination set in the vehicle.

3. The image output device of claim 2, wherein the route navigation information includes a virtual image of the forward direction of the vehicle, and
 wherein the processor is configured to extract a graphic object corresponding to the planned driving lane from the virtual image and generate the main carpet image based on the graphic object.

4. The image output device of claim 3, wherein the processor is configured to:
determine a matching condition for matching the forward image and the virtual image; and
generate the main carpet image by changing the graphic object based on the matching condition.

5. The image output device of claim 4, wherein the matching condition is a coordinate system transformation matrix for converting the virtual image into a coordinate system of the forward image.

6. The image output device of claim 3, wherein the processor is configured to:
determine a degree of similarity between the virtual image and the forward image; and
control the image output unit such that the main carpet image is output from a point in time based on the degree of similarity being greater than a reference value.

7. The image output device of claim 2, wherein the route navigation information is received from a navigation device through the communication unit, and
wherein the processor is configured to merge the main carpet image into the forward image and output the merged image through the image output unit.

8. The image output device of claim 1, wherein the processor is configured to:
search for an object corresponding to a preset conditions; and
control, based on a preset user input being received, the image output unit such that a sub carpet image indicating a route to a destination corresponding to the object is output together with the main carpet image.

9. The image output device of claim 8, wherein the processor is configured to, abased on a determination that plurality of objects corresponding to the preset condition are present, control the image output unit such that a plurality of sub carpet images are output together with the main carpet image.

10. The image output device of claim 9, wherein the processor is configured to highlight one of the sub carpet images, and
wherein the one sub carpet image highlighted varies according to a user input.

11. The image output device of claim 10, wherein the processor is configured to, based on a user selection of the one sub carpet image, control the communication unit such that a driving direction of the vehicle is changed to a route set in the one sub carpet image.

12. The image output device of claim 11, wherein the processor is configured to, based on a user selection of the one sub carpet image, control the image output unit such that the main carpet image disappears.

13. A method for controlling an image output device, the method comprising:
receiving a forward image that captures an image in a forward direction of a vehicle;
specifying at least one planned driving lane on which the vehicle is planned to travel based on route navigation information guiding a destination set in the vehicle;
searching for the planned driving lane from the forward image; and
outputting a main carpet image indicating the planed driving lane in lane units through an image output unit, wherein the outputting the main carpet image comprises outputting the main carpet image overlapped with the planned driving lane;
extracting a sign from the forward image and searching for the planned driving lane by using at least one of a character or a symbol included in the sign;
acquiring road information regarding planned travel of the vehicle;
searching, based on the sign, for at least one of the character or the symbol corresponding to the road information;
specifying the planned driving lane based on at least one of the character or the symbol included in the sign corresponding to the road information; and
changing the main carpet image based on the specified planned driving lane.

14. The method of claim 13, wherein the route navigation information includes a virtual image of the forward direction of the vehicle,
wherein the outputting of the main carpet image through the image output unit includes:
extracting a graphic object corresponding to the planned driving lane from the virtual image; and
generating the main carpet image based on the graphic object.

15. The method of claim 14, wherein the generating of the main carpet image using the graphic object includes:
determining a matching condition for matching the forward image and the virtual image; and
generating, based on the matching condition, the main carpet image by changing the graphic object.

16. The method of claim 13, further comprising:
searching for an object corresponding to a preset condition; and
outputting, based on a preset user input, a sub carpet image indicating a route to a destination corresponding to the object together with the main carpet image.

17. The method of claim 16, wherein a plurality of sub carpet images are output together with the main carpet image based on a determination that a plurality of objects corresponding to the preset condition are present.

18. The method of claim 17, further comprising:
changing, based on a user selection of one of the plurality of sub carpet images, a driving direction of the vehicle to a route set in the one sub carpet image.

19. The method of claim 18, further comprising:
controlling the image output unit such that the sub carpet image disappears based on a determination that the object is located out of a predetermined range with respect to the vehicle while the sub carpet image is being output.

* * * * *